(12) United States Patent
Nienaber et al.

(10) Patent No.: US 12,285,867 B2
(45) Date of Patent: Apr. 29, 2025

(54) DUAL MOUNTING FOR AUTOMATED REPAIR SYSTEMS

(71) Applicant: 3M INNOVATIVE PROPERTIES COMPANY, St. Paul, MN (US)

(72) Inventors: Aaron K. Nienaber, Lake Elmo, MN (US); Brett R. Hemes, Woodbury, MN (US); Thomas J. Strey, River Falls, WI (US); Christie L. Vitale, Hudson, WI (US); Nathan J. Herbst, Woodbury, MN (US); Jonathan B. Arthur, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 284 days.

(21) Appl. No.: 17/779,218

(22) PCT Filed: Nov. 24, 2020

(86) PCT No.: PCT/IB2020/061076
§ 371 (c)(1),
(2) Date: May 24, 2022

(87) PCT Pub. No.: WO2021/105867
PCT Pub. Date: Jun. 3, 2021

(65) Prior Publication Data
US 2023/0013731 A1 Jan. 19, 2023

Related U.S. Application Data

(60) Provisional application No. 62/940,950, filed on Nov. 27, 2019.

(51) Int. Cl.
*B25J 9/16* (2006.01)
*B25J 11/00* (2006.01)
(Continued)

(52) U.S. Cl.
CPC .......... *B25J 9/1633* (2013.01); *B25J 9/1653* (2013.01); *B25J 11/0065* (2013.01);
(Continued)

(58) Field of Classification Search
CPC .................................................... B25J 15/0066
See application file for complete search history.

(56) References Cited

U.S. PATENT DOCUMENTS

2009/0017212 A1* 1/2009 Clifford .............. B05B 13/0431
427/294
2013/0109277 A1* 5/2013 Panergo .................. B24B 19/26
901/41
(Continued)

FOREIGN PATENT DOCUMENTS

| CN | 107253146 A | 10/2017 |
|---|---|---|
| CN | 206536335 U | 10/2017 |

(Continued)

OTHER PUBLICATIONS

International Search Report for PCT Application No. PCT/IB2020/061076, mailed on Feb. 26, 2021, 5 pages.

*Primary Examiner* — Jaime Figueroa
*Assistant Examiner* — Jerrod Irvin Davis

(57) ABSTRACT

A dual mounted end-effector system mounted on a motive robot arm for preparing an object surface is described. The system includes a first tool configured to contact and prepare the object surface and a second tool configured to contact and prepare the object surface. The system also includes a force control. The force control is configured to align, in a first state, with the first tool in position to contact and prepare the object surface and, in a second state, with the second tool in a position to contact and prepare the object surface.

29 Claims, 12 Drawing Sheets

(51) Int. Cl.
  *B25J 13/08*      (2006.01)
  *B25J 15/00*      (2006.01)
(52) U.S. Cl.
  CPC ......... *B25J 11/0075* (2013.01); *B25J 13/081* (2013.01); *B25J 13/085* (2013.01); *B25J 13/089* (2013.01); *B25J 15/0066* (2013.01)

(56) References Cited

U.S. PATENT DOCUMENTS

| | | | |
|---|---|---|---|
| 2013/0244551 A1 | 9/2013 | Liu | |
| 2017/0329316 A1* | 11/2017 | Morimura | B23B 3/065 |
| 2017/0355025 A1* | 12/2017 | Rola | B25J 9/1687 |
| 2022/0016774 A1 | 1/2022 | Amell et al. | |

FOREIGN PATENT DOCUMENTS

| | | |
|---|---|---|
| CN | 107738185 A | 2/2018 |
| DE | 102010003697 A1 | 10/2011 |
| DE | 102017213143 A1 | 1/2019 |

* cited by examiner

DUAL MOUNTING FOR AUTOMATED REPAIR SYSTEMS

CROSS REFERENCE TO RELATED APPLICATIONS

This application is a national stage filing under 35 U.S.C. 371 of PCT/IB2020/061076, filed Nov. 24, 2020, which claims the benefit of U.S. Provisional Application No. 62/940,950, filed Nov. 27, 2019, the disclosures of which are incorporated by reference in their entireties herein.

BACKGROUND

The automotive industry often needs to prepare surfaces of vehicle parts or replacement parts (e.g., a bumper) for various purposes (e.g., painting), or to repair surfaces of car parts or replacement parts due to defects incurred during painting or coating. Typical surface preparation processes include, for example, physically abrading car surfaces, or "scuffing". Typical repair operations often include, for example, sanding and polishing. Surface preparation and repair of defects on surfaces can utilize different tools.

BRIEF DESCRIPTION OF THE DRAWINGS

The disclosure may be more completely understood in consideration of the following detailed description of various embodiments of the disclosure in connection with the accompanying figures, in which.

Figure 1:
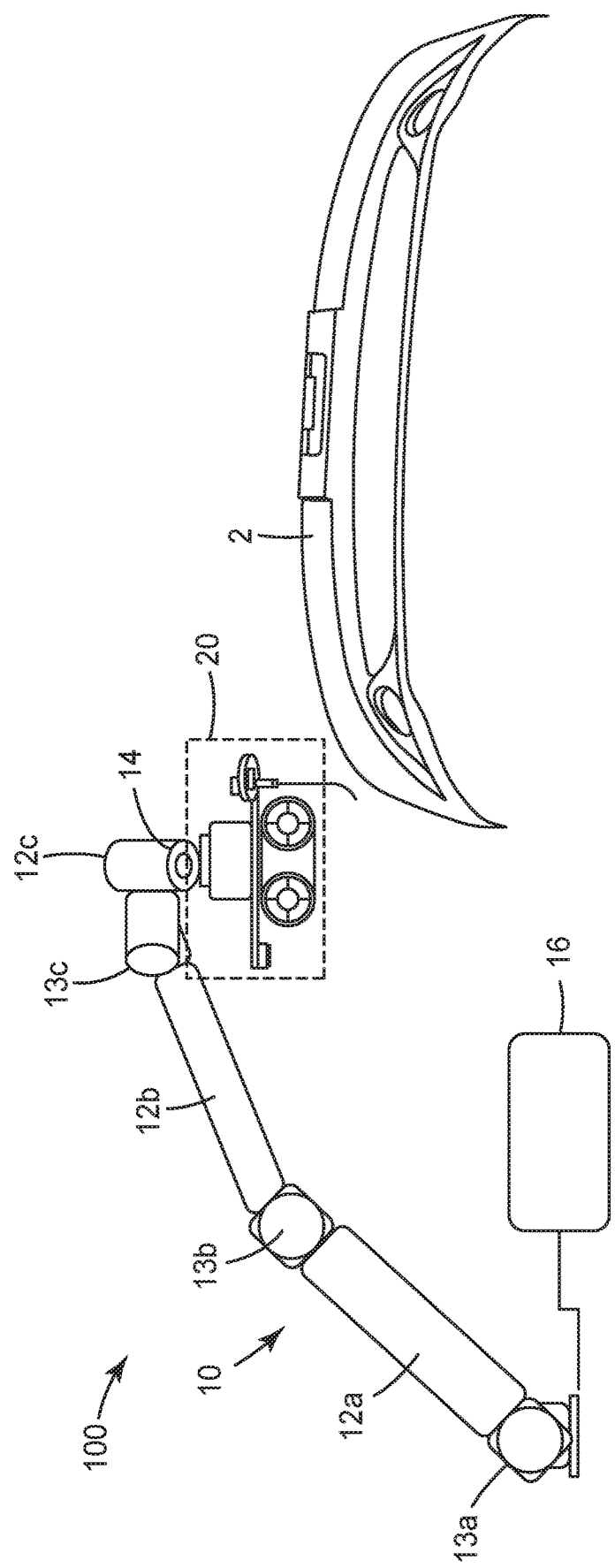
FIG. 1 illustrates a side perspective view of a surface preparation system including a smart end-effector tool to scuff an object surface, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

The present disclosure provides automated systems and methods of using an end-effector with dual mounted tool to work on (e.g., scuffing, sanding, polishing, etc.) an object surface. An automated surface preparation system is provided to include an end-effector with dual mounted tools and a motive robot arm. The dual mounted tools are mounted on the motive robot arm. Each of the tools include a functional component configured to contact and prepare the object surface; one or more sensors configured to detect working state information of the end-effector tool, and potentially a dispenser for fluid while the functional component contacts and prepares the object surface; and a control circuit to receive signals from the sensors and process the signals to generate state information of the end-effector tool.

In some embodiments, an automated surface preparation system can be initialized by communicating with an end-effector tool with a robot arm thereof to update the respective state information of the end effector and each of the dual mounted tools. While the end-effector tool contacts and prepares the object surface, one or more on-board sensors can detect working state information of the mounted tools to generate tool state signals. A control system can process the tool state signals from the sensors to generate real-time state information, notifications and instructions, and transmit the notifications and instructions to a robot controller, which can in turn adjust locomotion parameters of the robot arm and also the control parameters of the end-effector tool itself, based on the real-time state information and the notifications and instructions from the end-effector and dual mounted tools.

Figure 2:
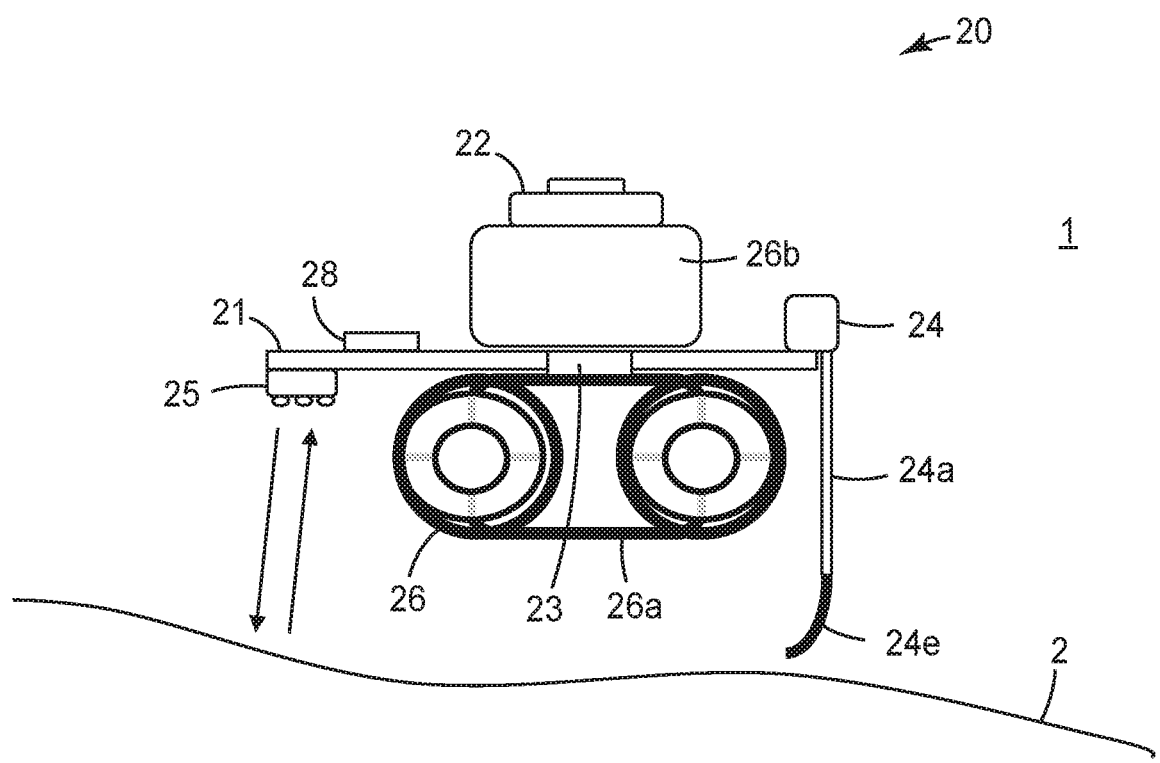
FIG. 2 illustrates a side perspective view of a smart end-effector tool.

FIGS. 1 and 2 illustrate an automated surface preparation system discussed, for example, in co-owned U.S. Provisional Patent Application No. 62/781,874 filed on Dec. 19, 2018. The system of FIGS. 1 and 2 is discussed with respect to an end effector with a single tool. However, as discussed with respect to FIGS. 3-8, embodiments of the present invention involve many similar machine components.

FIG. 1 illustrates a side perspective view of an automated surface preparation system 100 including a smart end-effector 20, to which a tool can be attached and used to scuff an object surface 2, according to one embodiment. The surface preparation system 100 further includes a robot arm 10. The robot arm 10 includes multiple arm sections 12*a*-*c* connected by joints 13*a*-*c*. The smart end-effector 20 is functionally connected to a mounting interface 14 at the distal end of the robot arm 10. The mounting interface 14 may be designed based on certain mounting standards and compatible with various end-effectors based on the same mounting standards. In some embodiments, the mounting interface 14 may include various mechanical and electrical means to functionally connect the end effector 20 to the robot arm 10. For example, the mounting interface may include any suitable fastening device to mechanically mount the smart end-effector 20 onto the robot arm 10; the mounting interface may include any suitable electrical connections to communicate electrical signals between a tool and the robot arm or provide electrical power from the robot arm to the tool.

A robot controller 16 is used to execute a robot arm command program to control the locomotion of the robot arm 10 such that the movement trajectory of the smart end-effector 20 can be precisely controlled. In some embodiments, the robot arm command program may control the locomotion of the robot arm via a set of locomotion parameters including, for example, positions, orientations, velocities of the arm sections and joints. The object surface 2 can be, for example, an auto part surface (e.g., a bumper). The robot controller 16 can control the locomotion of the robot arm such that the end-effector 20 can control a tool used to contact and move around the object surface to prepare (e.g., scuffing, abrading, sanding, polishing, etc.) the object surface 2. In some embodiments, the robot controller 16 may include an optional power interface to a power source thereof to provide power to the end-effector tool in the form of electricity, pneumatic pressure, etc.

FIG. 2 illustrates a side perspective view of the smart end-effector 20 of FIG. 1, according to one embodiment. The smart end-effector 20 includes a mount interface 22 to mount the end-effector 20 onto the mounting interface 14 of the robot arm 10. The tool 20 is controlled by the locomotion of the robot arm 10 to adjust its position, orientation, movement trajectory, etc. when travelling around the object surface 2. In the depicted embodiment of FIG. 2, the smart end-effector 20 includes a single functional component 26 configured to contact and scuff the object surface 2 of FIG. 1. The functional component 26 includes a scuffing pad 26a and a motor 26b to move the scuffing pad 26b to scuff or abrade an object surface. In some embodiments, the scuffing pad may include an abrasive pad. The abrasive pad can abrade the object surface, for example, by oscillating, vibrating, or moving in a certain trajectory under a certain pressure against the object surface.

The end-effector 20 further includes one or more sensors to detect working state information of functional component 26, while the functional component is working or is about to work on the object surface 2. Related working state information may include, for example, displacement information between the functional component 26 and the object surface 2, mapping information of the object surface 2 including surface positions, planes, orientations, etc., physical contact information between the functional component 26 and the object surface 2 including, for example, contact pressure information, vibration information, etc. In the depicted embodiment of FIG. 2, the end-effector 20 includes a pressure sensor 23, a flex sensor 24, and an ultrasonic sensor 25 to detect the related working state information. At least some camera, or other optical based sensors may also be present for determining whether the end effector, or either tool, is positioned appropriately. It is to be understood that other suitable sensors can be used to obtain desired working state information of end-effector 20. Also, multiple sensors can be distributed at various locations of end-effector 20 and functional component 26 to monitor its working state.

The pressure sensor 23 can be positioned adjacent to the scuffing pad 26a to monitor the physical contact pressure between the scuffing pad 26a and the object surface 2. In the depicted embodiments of FIG. 2, the pressure sensor 23 is disposed between the scuffing pad 26a and a mounting board 21 of the scuffing pad 26a. In some embodiments, the pressure sensor 23 can be positioned between the scuffing pad 26a and the object surface 2 or other suitable locations as long as the physical contact pressure between the scuffing pad 26a and the object surface 2 can be monitored in real time.

The flex sensor 24 is provided to measure the exact displacement between the tool and the objection surface and continuously map the object surface 2, e.g., to obtain a 2D perspective representation or a contour of the object surface 2. The flex sensor 24 includes one or more flexible sensing elements 24a extending toward the object surface 2 and having the respective distal ends 24e to contact the object surface 2 to provide contact measurements of the exact displacement and continuous surface mapping. In some embodiments, the flex sensing elements 24a can be analog resistive and their resistance may change with the flexion amount thereof. The analog signals from the flexible sensing elements 24a can be amplified and sampled by a control circuit 28 in real time to generate surface mapping data for the object surface 2. However, while a flex sensor is described as one implementation option for measuring a displacement between the tool and the object surface, other sensor technologies are expressly contemplated, including other linear distance sensors, particularly non-contact distance sensors.

The ultrasonic sensor 25 is provided to measure the relative position of the end-effector 20 with respect to the object surface 2 as well as a continuous mapping of the object surface. The relative position can be measured by an echolocation process where sound waves can be transmitted from the ultrasonic sensor 25, bounced back from the object surface 2 and received by the ultrasonic sensor 25, with the time difference used to calculate the distance between the end-effector 20 and the object surface 2. The positioning signal of the ultrasonic sensor 25 can be sent to the control circuit 28 to determine a real-time displacement between and the end-effector 20 and the object surface 2. In some embodiments, the ultrasonic sensor 25 can provide the position and mapping information at a relatively coarse level which can be further refined by the measurement from a flex sensor and/or a pressure sensor.

The system of FIGS. 1 and 2 illustrate single end effector for a robotic assembly. However, many operations require the use of multiple tools, such as using a denibbing or other sanding tool to remove defects prior to sanding or polishing to smooth out a surface, or a wiping tool to clean or clear a surface. However, for a system such as that of FIG. 1 or FIG. 2, it would be required to first remove functional component, attach a second functional component, and then validate that the second functional component is correctly attached and communicating with the system controller.

Instead, embodiments described herein illustrate an end effector with dual-mounted tools, such that a single robot arm can switch between a first tool and a second tool based on the needs of a particular operation. Alternatively, a robot could switch between the first tool and the second tool in response to a command received from an operator.

Figure 3A:
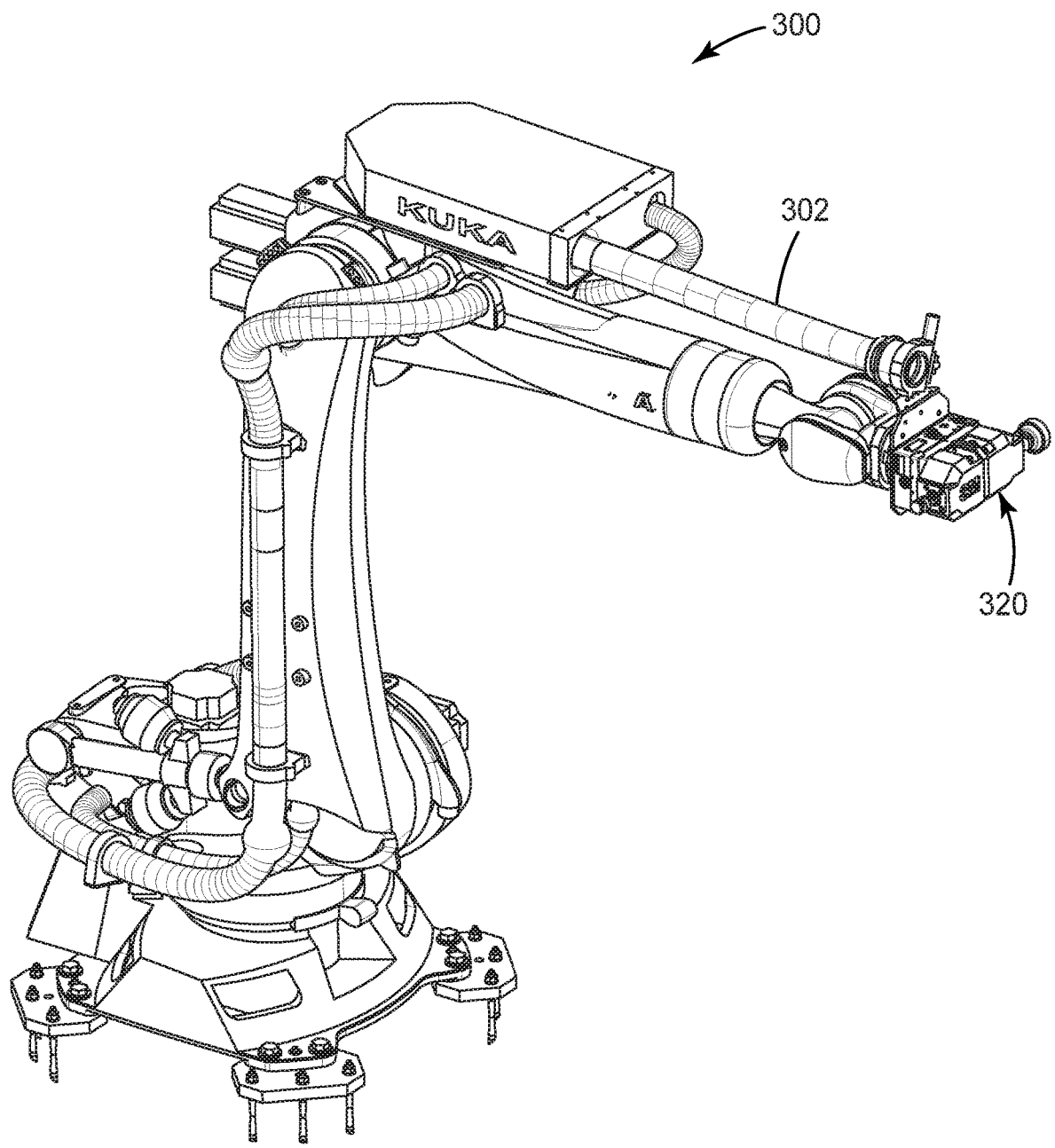
FIGS. 3A-3D illustrate an embodiment of a dual-mounted end effector system.
Figure 3B:
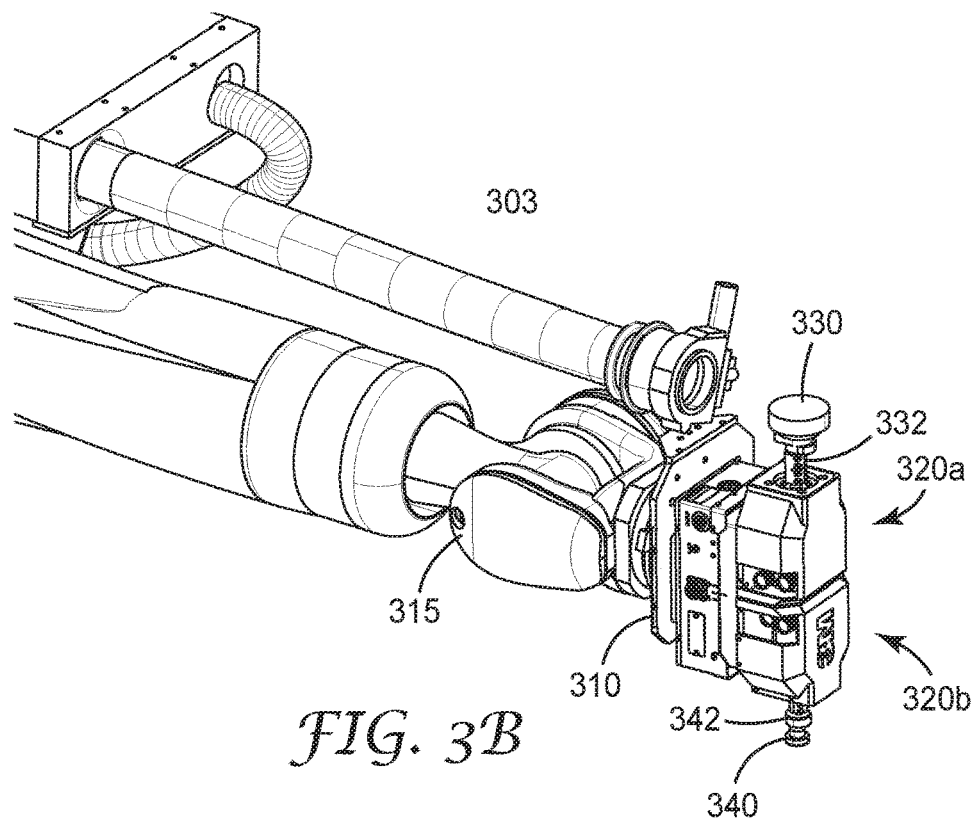

FIGS. 3A-3D illustrate an embodiment of a dual-mounted end effector system 320 on a robot arm 300. FIG. 3A illustrates a system view of robot arm 300. FIG. 3B illustrates a view of the end-effector system in a use-position. Robot arm 300 may have a cable mounting configuration 302. A robot arm 300 has a dual-mounted end effector system 320 mounted on a mounting plate 350. Robot arm 300 can move end effector system 320 rotationally, using rotational plate 310 and vertically, using joint 315, in order to place a first tool 330 or a second tool 340 in position to interact with a workpiece. Each of first and second tool 330, 340 have a connector 332, 342, respectively, that connects to an end effector unit 320a, 320b, respectively.

FIG. 3B illustrates end effector system 320 in one of two use positions, with second tool 340 in position to engage a workpiece. As discussed with respect to FIG. 4, system 320 uses a single force control to operate both first and second tool 330, 340. First and second use position have one of tools 330, 340 aligned in parallel with force control.

Figure 3C:
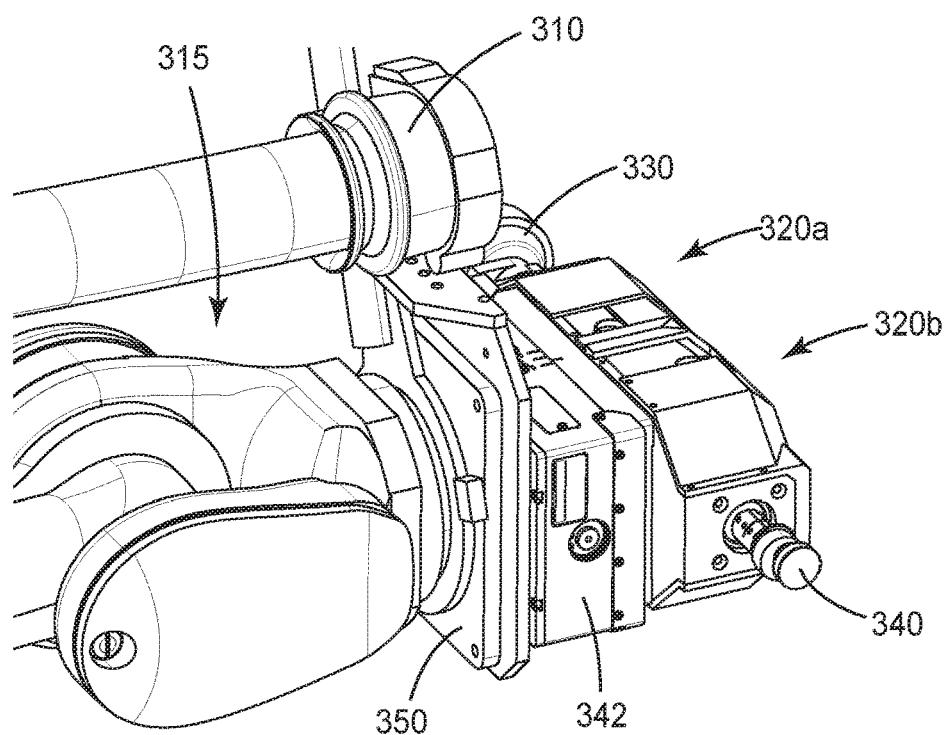
Figure 3D:
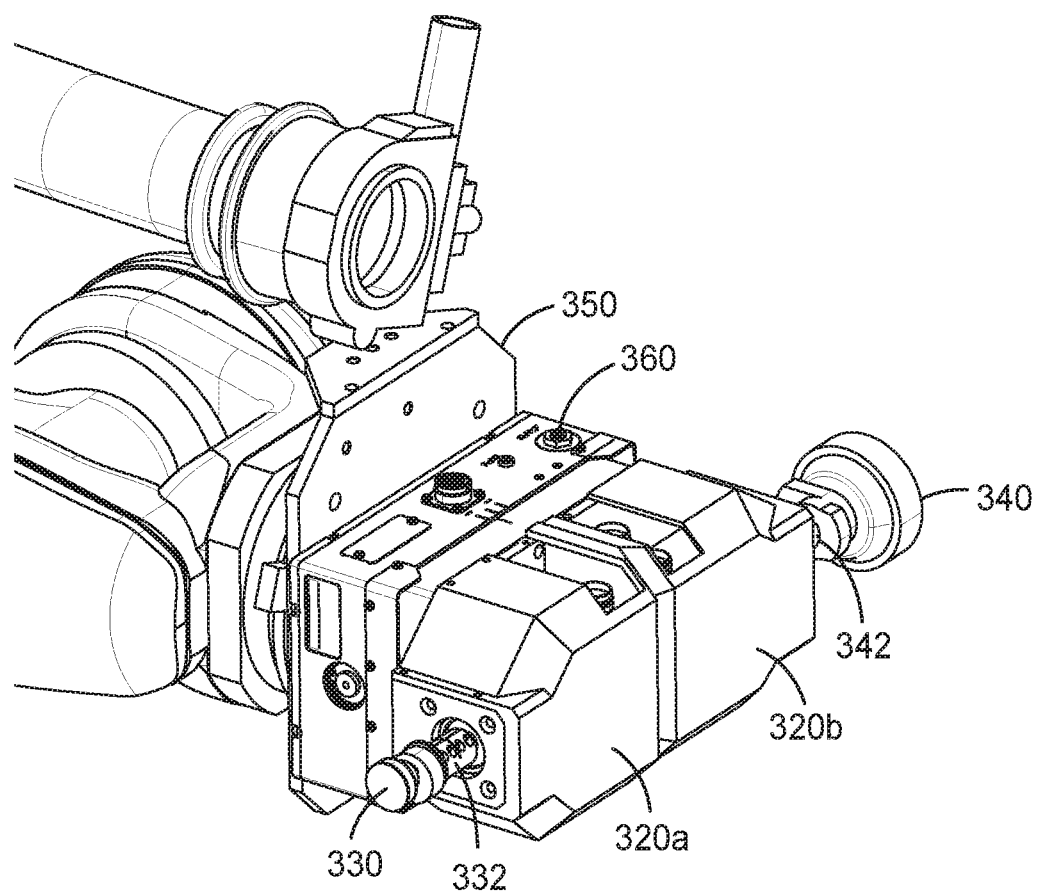

FIG. 3C illustrates a side-view of end effector system 320. FIG. 3D illustrates a front view of end effector system 320, illustrating how end effectors 320a, 320b are positioned in relation to force control 360 and mounting plate 350.

Figure 4A:
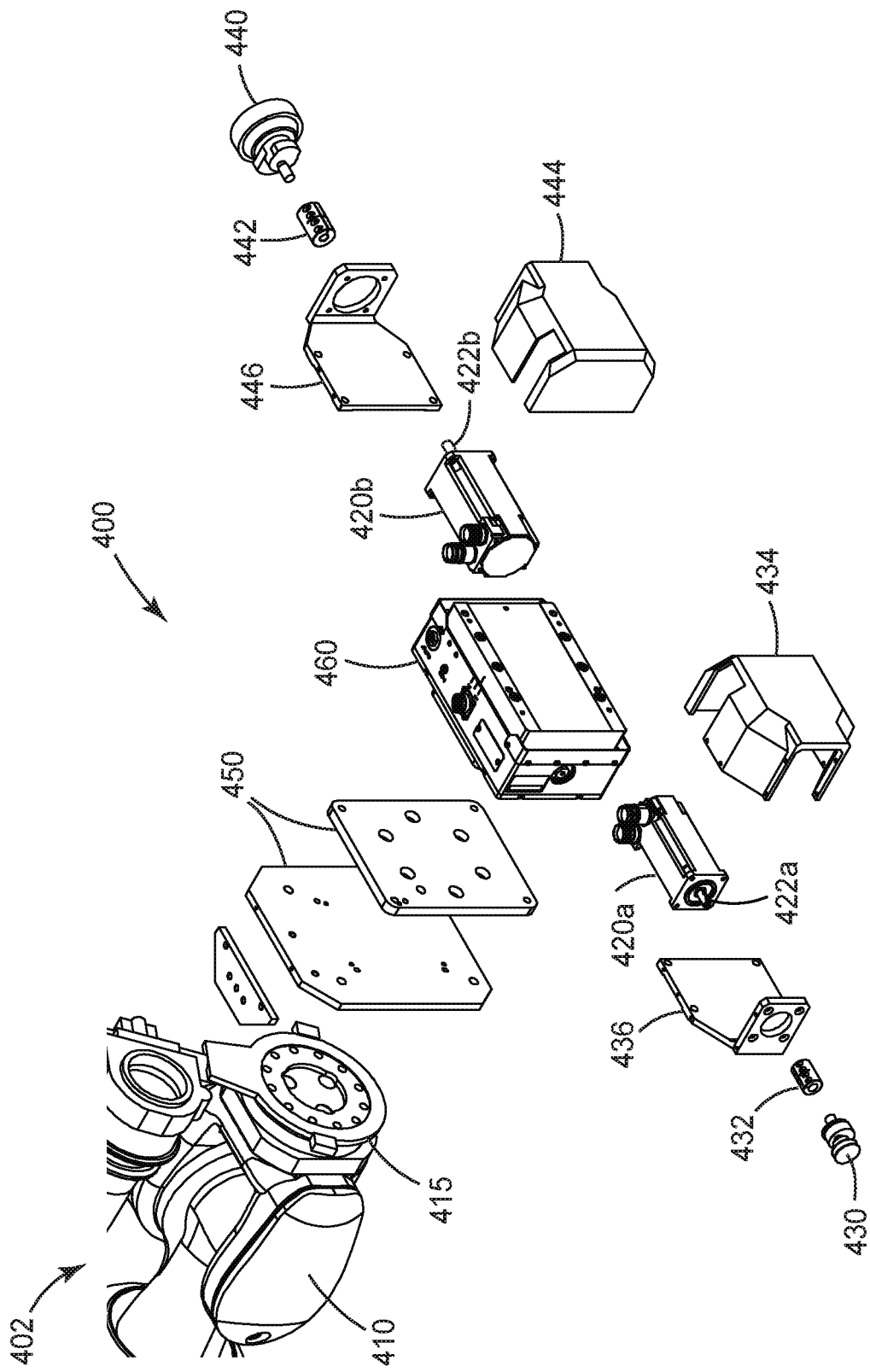
FIGS. 4A-4D illustrate structural views of an embodiment of a dual-mounted end-effector system.
Figure 4B:
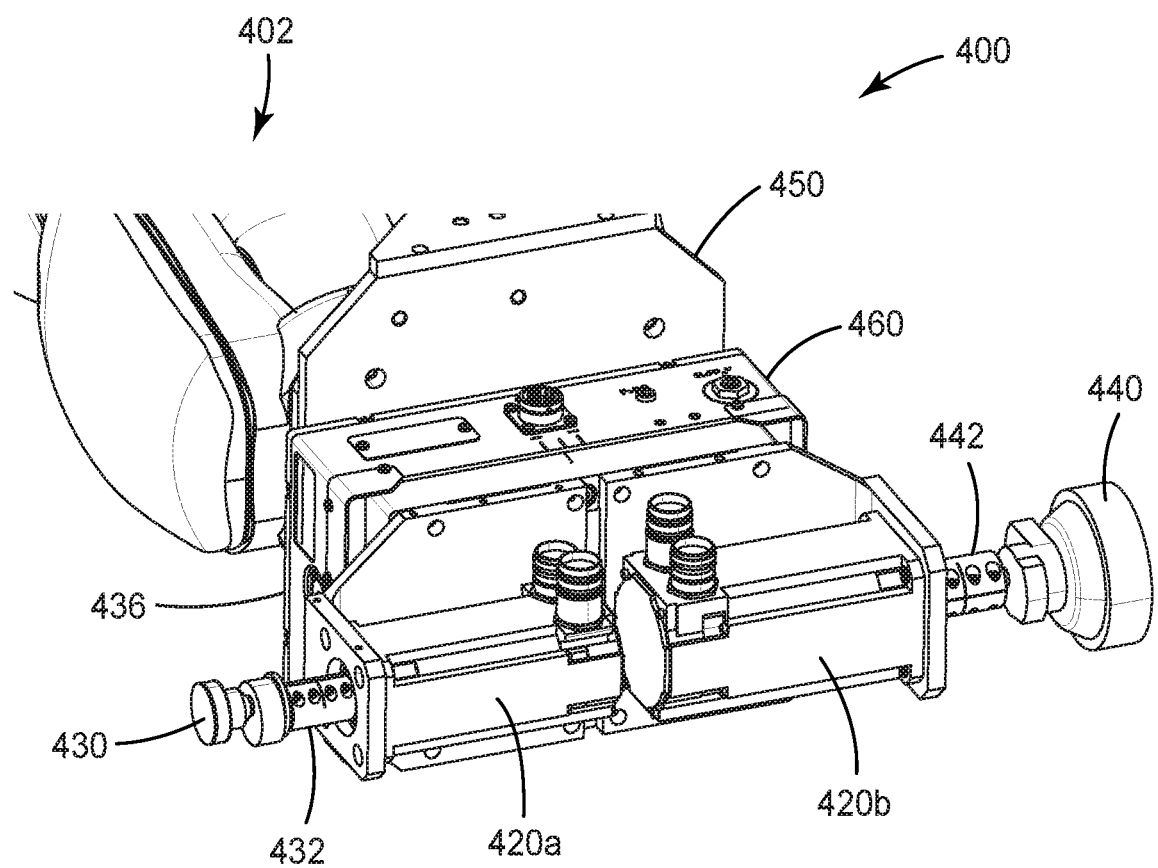
Figure 4C:
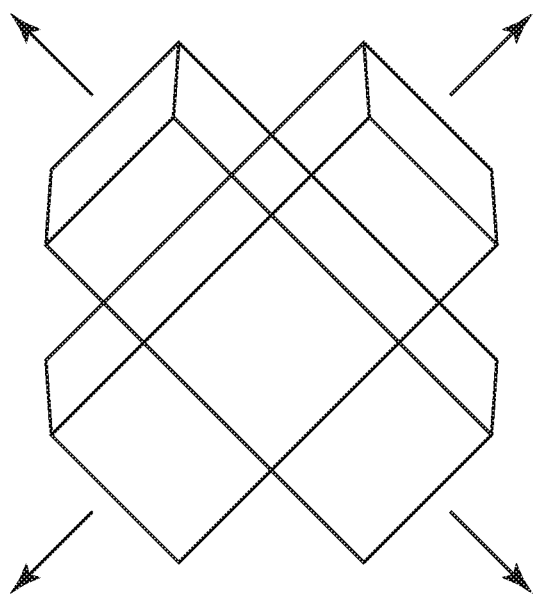
Figure 4D:
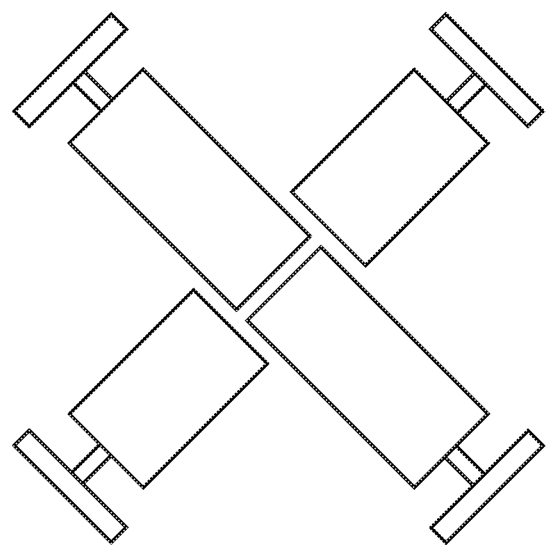

FIGS. 4A and 4B illustrate structural views of an end-effector system in accordance with embodiments described herein. FIG. 4A illustrates an exploded view of an end effector system 400. End-effector system 400 can be moved, in any of a variety of suitable orientations, by a robotic arm using vertical movement joint 410. End-effector system 400 can be moved rotationally by movement of plate 415.

End-effector system 400 is mounted to a robot arm by one or more mounting plates 450.

A first end effector motor 420a couples to first tool 430 through a tool connector 432 that interacts with a spindle 422a. End effector motor 420a couples to force control 460 through a first mount 436. First mount 436 also couples to first housing 434.

A second end effector motor 420b couples to second tool 440 through a tool connector 442 that interacts with a spindle 422b. End effector motor 420b couples to force control 460 through a second mount 446. Second mount 446 also couples to second housing 446. Housings 436, 446 may function to keep dust and debris away from motors 420a, 420b.

FIG. 4B illustrates an assembled end-effector system 400 connected to a robot arm 402, with housings 436, 446 removed for clarity.

Two different tools 430, 440 are illustrated in FIGS. 4A and 4B. Tools 430, 440, in one embodiment, are the same tool—e.g. both are denibbing tools, both are polishing tools, both are wiping tools, both are sanding tools, or both are other tools. Additionally, one or both tools may be imaging tools, spraying tools or a fluid (such as water or polish) applicator. Having two available tools may increase operation time for a robot prior to the need for an operator to intervene and/or until the robot needs servicing, such as disc changing, polish pad changing, etc. For example, when a first tool 430 wears out, robotic arm 402 can rotate end effector system 400, by rotating plate 415, put second tool 440 in place and continue an operation. However, in another embodiment, tools 430, 440 are different. For example, tools 430 and 440 may both be sanding tools, but vary in their abrasive grit or surface area. Alternatively, tools 430 and 440 may be different tools, such as a denibber 430 and a sander 440. Any suitable combination of tools may be appropriate, and is envisioned as part of this disclosure.

Additionally, the embodiment of FIGS. 4A and 4B illustrate a system with two tools. However, in another embodiment, such as those illustrated in FIGS. 4C and 4D a third and fourth tool are also added, along an axis perpendicular to the axis of motors 420a, 420b. The third and fourth tool could be paired with a second force control positioned perpendicular to force control 460. Alternatively, the third and fourth tool could be paired with force control 460, so long as either the third and forth tool, or force control 460, can rotate such that third and forth tool are parallel to force control 460 when in operation. Additionally, while two or four tools are illustrated in the configurations of FIGS. 4A-4D, it is expressly contemplated that additional tools could be arranged, coupled to force control units, on a motive robot arm.

Figure 5A:
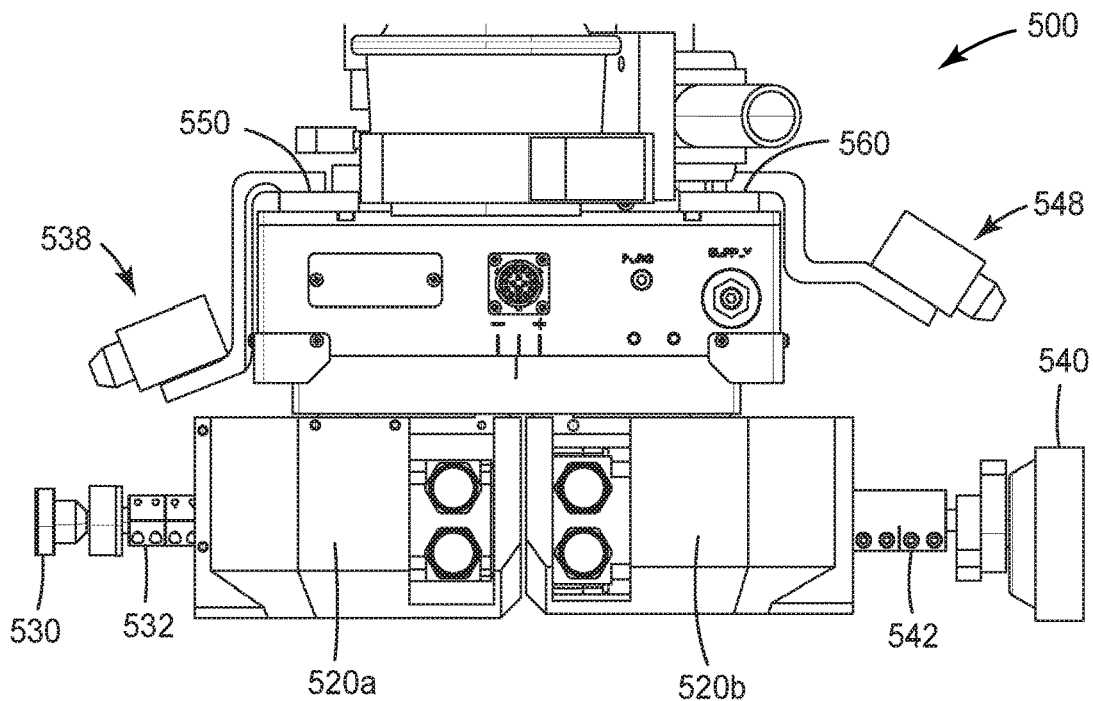
FIGS. 5A and 5B illustrate an embodiment of an end effector assembly with nozzles.
Figure 5B:
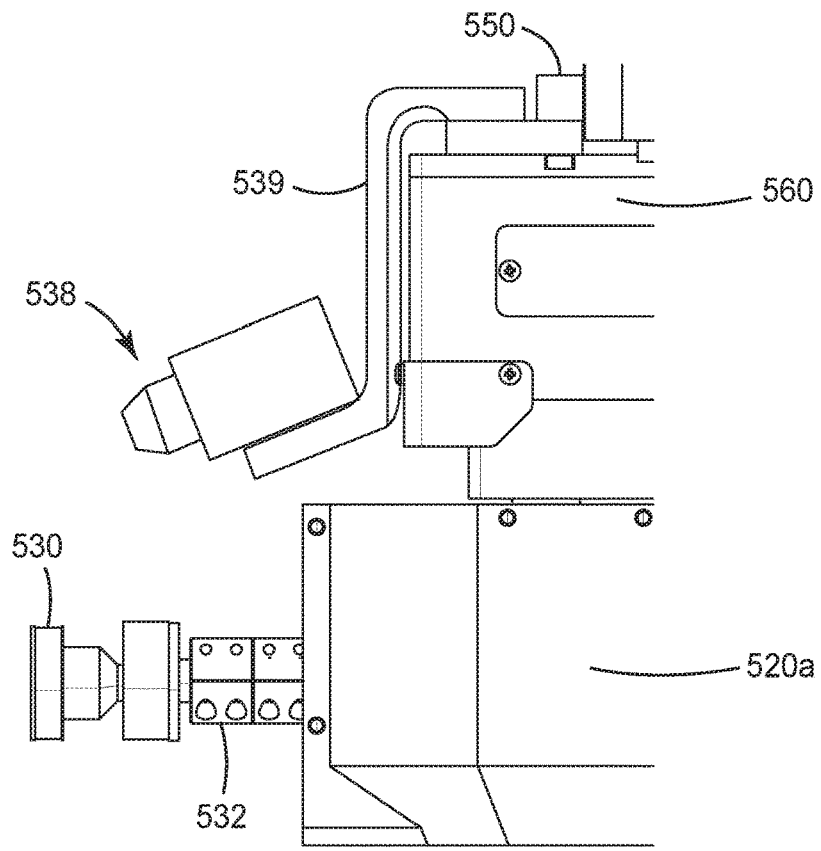

FIGS. 5A and 5B illustrate an embodiment of an end effector assembly with nozzles. End effector assembly 500 has a first end-effector 520a coupled to a first tool 530 using a connector 532. First tool 530 may receive an operation benefit from fluid being present on a working surface. Therefore, in one embodiment, a nozzle 538 is mounted to mounting plate 550 by a nozzle mount 539. Nozzle 538 may connect to a source of, and dispense either water or polish, depending on an operation need. Similarly, a second end-effector 520b is coupled to a second tool 540 using a connector 542. Second tool may also be associated with a second nozzle 548, that can dispense a working fluid such as coolant, grinding aid, oil, soap, water and/or polish.

Systems such as those described in FIGS. 3-5 provide operational benefits over a single end-effector coupled to a robot arm. Multiple tool design allows the process to be modified dynamically to accommodate changing or unexpected operational conditions without having to change tool heads and without having to reposition other robots with the needed tools. Embodiments of end effector assemblies described herein include motors with a modular connection system, allowing for tools to be interchanged by connecting tools to a spindle associated with an end effector motor using a connection mechanism. This can allow for a variety of tools to be connected to the same assembly, without having to change out end effectors for different tools. However, direct connections between end effector motors are also envisioned. Consolidation of a variety of tools in the same assembly and control system allows for a significant reduction in system complexity, a reduction in time needed for dynamic reconfiguration as well as a potential reduction in the number robots needed to complete a process operation.

Figure 6:
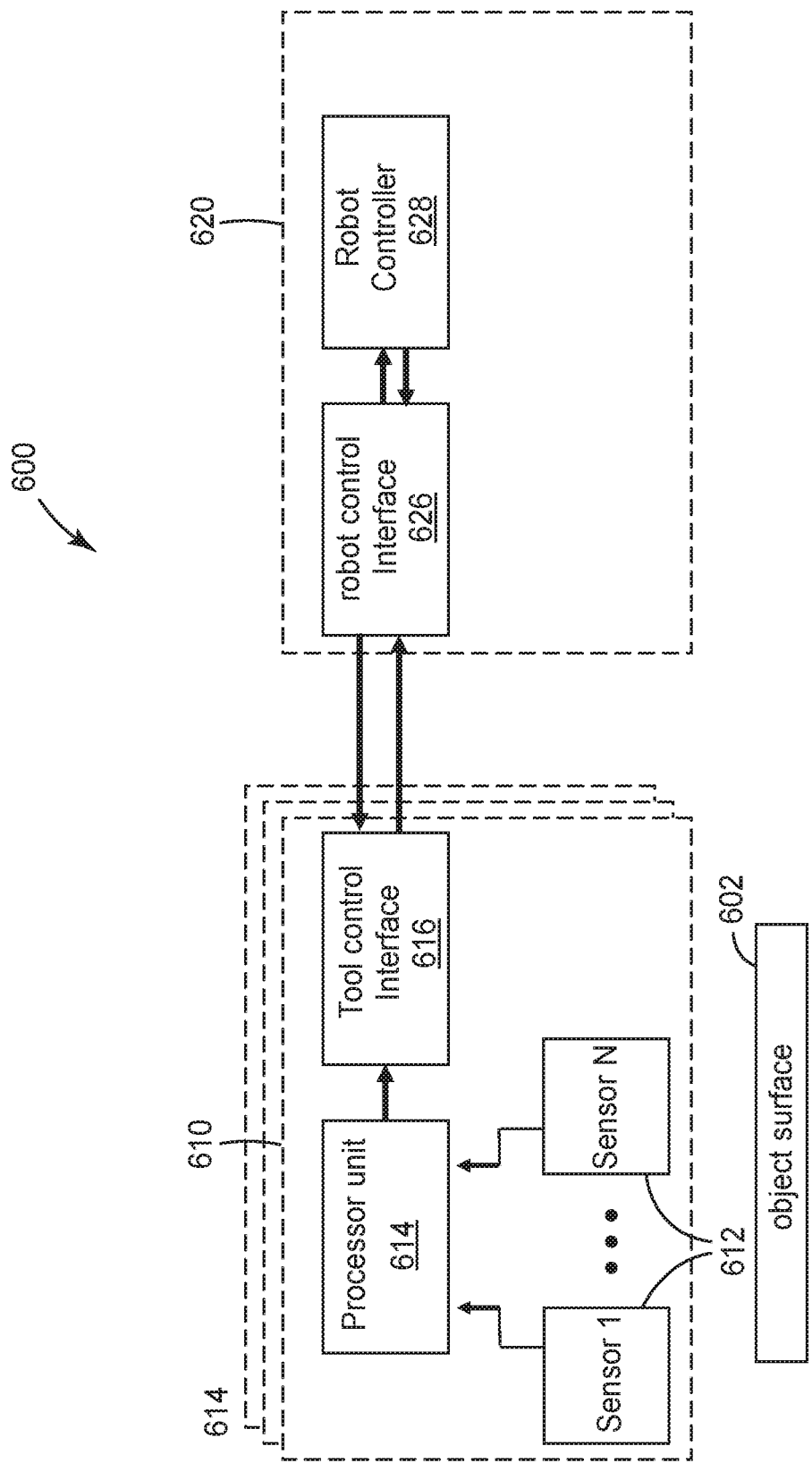
FIG. 6 illustrates a block diagram of an embodiment of a surface preparation system.

FIG. 6 illustrates a block diagram of a surface preparation system 600 including an end effector system 610 functionally connected to a motive robot arm 620 to prepare an object surface, according to one embodiment. As illustrated in FIG. 6, several end effector systems 610 can be coupled to a single robot arm 620. For example, two end effector systems 610 can be coupled to a force control such that each end effector system 610 is rotated 180° from the other. This allows a single force control to operate either end effect systems 610.

In another embodiment, more than two end effector systems 610 can be coupled to a single motive robot arm 620. For example, another set of end effector systems 610 can be mounted 180° from each other, and perpendicularly to the first set of end effector systems 610. A single force control can operate all four end effector systems by rotating 90° between each such that an end effector system 610 coupled to a tool of interest is in line with the force control.

Each smart end-effector 610 includes multiple sensors 612 (e.g., Sensor 1, . . . Sensor N) to detect its working state information with respect to the object surface 602. The multiple sensors 612 can include, for example, one or more of the pressure sensor 23 of FIG. 2, one or more of the flex sensor 24 of FIG. 2, one or more of the ultrasonic sensor 25 of FIG. 2, one or more of other types of sensors, and any combinations of the sensors. Raw signals (e.g. analog sensor signals) from the sensors 612 are received and processed by a processor unit 614 (e.g., the control circuit 28 of FIG. 2). The processor unit 614 may include an analog-to-digital converter (ADC) component to sample analog sensor signals and convert the analog sensor signals to digital signals. The processor unit 614 may further include a digital signal processing component to process and distill the digital signals to generate real-time tool state information, notifications, or instructions, and communicate the generated information to the robot controller and/or the force controller.

In some embodiments, the real-time tool state information generated by the processor unit 614 of the tool may include, for example, current position information of the tool with respect to the object surface. The real-time tool state information may further include, for example, a contact pressure indicating whether the tool contacting the object surface appropriately or not, a real-time change in the displacement between the object surface and the tool, etc.

In some embodiments, the processor unit 614 can combine the positioning data from the ultrasonic sensor 25, the surface mapping data from the flex sensor 24 and the pressure data from the pressure sensor the microcontroller 23 to reconstruct the object surface 2 and derive a path for the end-effector tool to travel over the object surface 602 and prepare (e.g., scuff, abrade, sand, or polish) the object surface 602. In some embodiments, processing unit 614 only modifies an existing robot path to account for variation between the planned path and an actual position of the workpiece. In some embodiments, the real-time notifications generated by the processor unit 614 of the tool may include, for example, position notifications (e.g., a notification to the robot controller that the tool is at an edge of the object surface), safety notifications (e.g., a notification to the robot controller that the contact pressure is above an upper limit), etc.

In some embodiments, the instructions generated by the processor unit 614 of a tool may include, for example, a tool-operation instruction regarding how to control the operation of the tool, a locomotion instruction to instruct the robot controller to adjust the position of the tool, or the movement trajectory or velocity of the tool, etc. A tool-operation instruction may include, for example, an on/off instruction to the robot controller to turn on/off the tool, a motor control instruction to the robot controller to control the operation of a motor of the tool, etc. For example, the processor unit 614 may send an instruction to the robot controller to instruct the robot arm to move away from the object surface when the processor unit 614 determines that the contact pressure is above a limit. The processor unit 614 may send an instruction to the robot controller to instruct the robot arm to reduce the speed of the tool movement when the processor unit 614 determines that the tool is approaching the object surface. The processor unit 614 may send an emergency stop instruction to the robot controller to stop the operation of the tool when the processor unit 614 determines that there is a process event requiring immediate action or stoppage (e.g., the tool is contacted by an unidentified protrusion in the object surface).

The real-time state information, notifications, or instructions from the smart end-effector tool 610 can be sent to the robot controller 16 via the tool control interface 616 and the robot control interface 626. The robot controller 16 can then use the real-time state information to simultaneously update the locomotion parameters of the robot arm such that the movement trajectory of the smart end-effector tool 310 can be precisely controlled. The robot controller 628 can also control the surface preparation system 600 accordingly by taking actions upon the notification or following the instructions from the smart end-effector tool 610. In some embodiments, the robot controller 628 may receive real-time state information, notifications, or instructions from the smart end-effector tool, interpret the received information, check whether the notifications or instructions are compatible with pre-set rules, and implement instructions correspondingly. For example, the robot controller 628 may provide the tool with a movement vector for the tool's position adjustment with respect to the object surface; the robot controller 628 may instruct the robot arm and/or force control unit to provide an appropriate force to press the tool against the object surface; the robot controller 628 can provide an emergency stop command to the tool to stop when an emergency condition is determined by the robot controller, etc.

Figure 7:
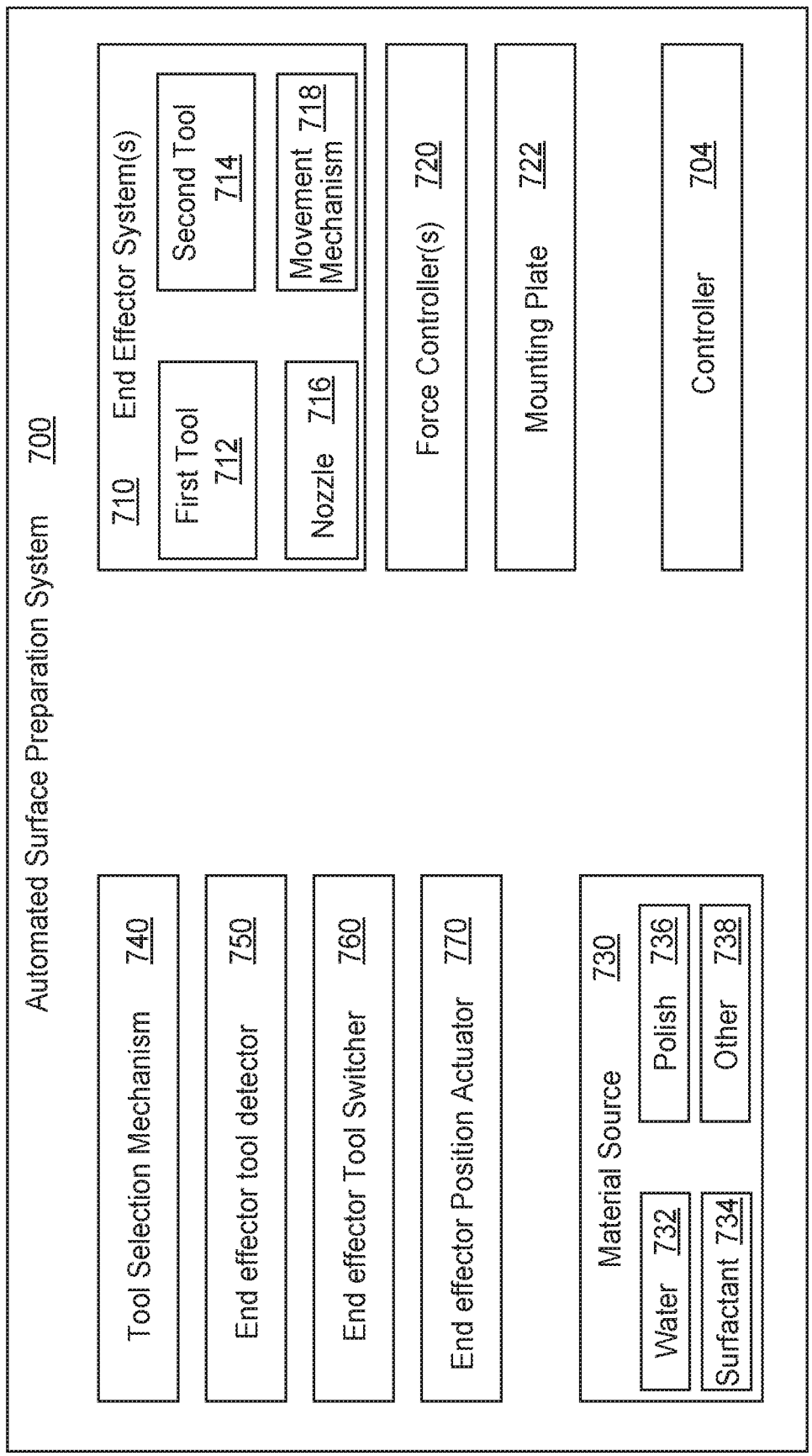
FIG. 7 illustrates a block diagram of an embodiment of dual-mounted end effector system.

FIG. 7 illustrates a block diagram of an embodiment of dual-mounted end effector system. System 700 may be configured to connect to a motive robot arm, for example through mounting plate 722.

System 700 includes an end effector system 710. End effector system 710 is a dual-mount system that supports a first tool 712 and a second tool 714. In one embodiment, only one of first and second tools 712, 714 is operational at a time. In one embodiment, first and second tools 712, 714 are arranged such that the tools are rotationally 180° apart from one another. However, other configurations are also possible. Each of first and second tools 712, 714 may have associated sensors such as a pressure sensor, a flex sensor, an ultrasonic sensor or other suitable sensors for obtaining desired working state information.

System 710 also has one or more movement mechanisms 718 that allow for movement of tools 712, 714 into place with respect to work piece. In one embodiment, a tool 712 or 714 needs to be in line with, and parallel to, force control 720 to operate. Movement mechanism 718, in one embodiment, rotationally moves end effector system 710 such that either tool 712 or 714 is in place when needed.

System 700 includes a material source 730 configured to provide materials to a worksurface, for example using one or more nozzles 716. The provided materials may be, depending on an operation, water 732, surfactant 734, polish 736, or another suitable fluid 738.

In one embodiment, a tool selection mechanism 740 selects whether tool 712 or tool 714 should be aligned with force control 720. Tool selection mechanism 740 may make the selection in response to a user selection, for example through a user interface. Tool selection mechanism 740, in another embodiment, may make the selection based on parameters for a given repair. For example, based on a known defect, a first sanding tool may be needed, and then a polishing tool may be applied. Tool selection mechanism 740, based on the repair process, may select the polishing tool when needed.

In one embodiment, end effector tool detector 750 is configured to detect a current tool in alignment with force control 720. End effector tool detector 750 may detect a current tool by detecting information from sensors associated with each of tool 712, 714. For example, in one embodiment, each tool has an associated motor that may not be powered or otherwise in an 'on' state when not aligned with force control 720. Similarly, other sensor information may also be used to report whether a tool is in alignment. End effector tool detector may, therefore, detect if a tool is in alignment based on sensor and/or power usage information.

End effector tool switcher 760 may, based on whether, and which, a tool is in alignment with force control, generate a signal that end effector system 710 needs to change position in order for a desired tool to be in alignment with force control 720.

End effector position actuator 770 actuates movement mechanism 718 to cause a desired tool 712 or 714 to align with force control 720 for a desired operation.

A single end-effector system 710, with two tools 712 and 714 has been described. However, it is expressly contemplated that, in one embodiment, a second end effector system 710 is present, with a third and fourth tool. The third and fourth tool may also be positioned 180° with respect to each other. The second end-effector system 710 may be positioned at an offset with respect to the first system, with the offset being great enough that a first tool, when not in operation, does not affect operation of a third tool on a workspace. In one embodiment, the two systems 710 are positioned such that a rotation of movement mechanism 718 of about 90° results in one of the four tools being in alignment with force control 720. However, rotation between each of the four tools may require greater, or less, rotation depending on the size of the tool and clearance required to ensure that tools not in use do not inappropriately engage a work surface.

Figure 8:
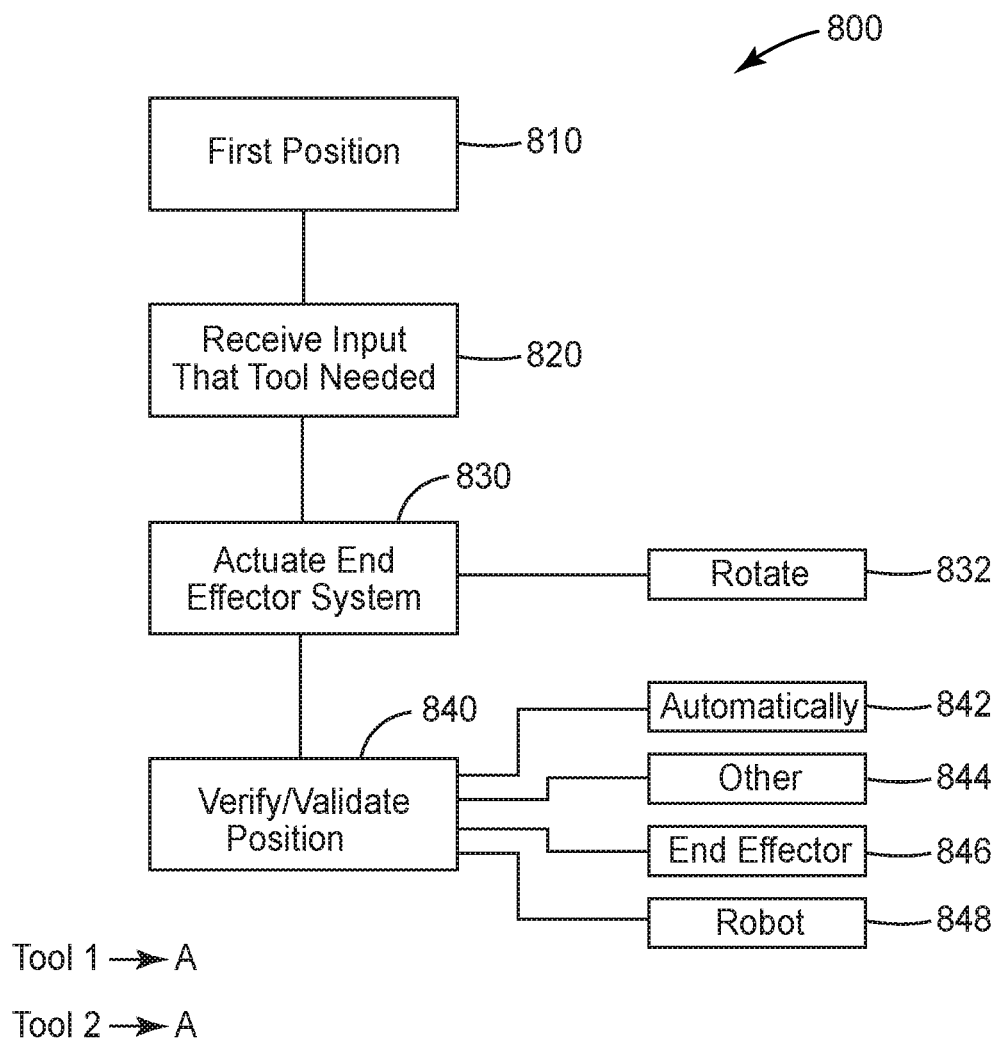
FIG. 8 illustrates a method of using a dual-mounted end effector in an embodiment of the present invention.

FIG. 8 illustrates a method of using a dual-mounted end effector in an embodiment of the present invention. Method 800 may be useful for any of the systems described with respect to FIGS. 3-7, or with another suitable dual-mounted end effector system.

In block 810, the end effector system is in a first position. The first position may be, for example, a first tool aligned with a force control.

In block 820, an input is received that a new tool is needed. The input may be received, for example, from an operator interacting with a user interface, in one embodiment. The input may come from, in another embodiment, from a set of repair instructions to be executed by an automated repair system.

In block 830, the end effector system is actuated. Actuation may include causing the end effector system to move from the first position to a second position, such that a tool is in alignment with a force control. In one embodiment, the end effector assembly comprises a first tool and a second tool, each mounted to the force control. In one embodiment, the first and second tools are positioned 180° apart from each other. Actuating the end effector system may, in such an embodiment, comprise rotating the end effector system until either the first or second tool is aligned with the force control.

In one embodiment, the end effector assembly comprises four tools, each mounted to a force control. In one embodiment, the four tools are oriented such that they are about 90° apart from one another. However, depending on the amount of space needed for a tool to operate freely, the tools may be closer or further apart. For example, two de-nibbing tools may be located more closely to one another than two sanding tools. The four tools may rotate such that each, in turn, aligns with a force control. In another embodiment, a four-tool end effector assembly requires two force controls, each with two tools positioned 180° apart, with the two force controls mounted perpendicularly to each other such that the four tools form a rough "X" shape.

In block 840, a tool position is validated. Validation may include ensuring that the tool is properly aligned with a force control. Validation may also include ensuring that the tool is properly connected to a motor. Validation may also include ensuring that sensors associated with the tool are all functioning properly. Validation may occur automatically, as indicated in block 842, or may include some operator intervention. Validation may be conducted by the end effector system, as indicated in block 846. Validation may also be conducted by a motive robot arm 848.

A dual mounted end-effector system mounted on a motive robot arm for preparing an object surface is described. The system includes a first tool configured to contact and prepare the object surface and a second tool configured to contact and prepare the object surface. The system also includes a force control. The force control is configured to align, in a first state, with the first tool in position to contact and prepare the object surface and, in a second state, with the second tool in a position to contact and prepare the object surface.

The first tool may have a first motor configured to operate the first tool when the system is in a first position, and the second tool may have a second motor configured to operate the second tool when the system is in a second position.

The first and second motors may be are mounted to the force control.

The first and second motors may be mounted end-to-end, such that the first tool and the second tool are about 180° apart.

The first tool may be selected from the group consisting of a sander, a polisher, a denibber, a sprayer, a fluid applicator, or a fluid removal tool. The first and second tool may be the same. The first and second tool may be different.

The end effector system may also have a third tool configured to contact and prepare the object surface and a fourth tool configured to contact and prepare the object surface. The third tool may be configured to operate when the end effector system is in a third position, and the fourth tool may be configured to operate when the end effector system is in a fourth position.

The system may further include a second force control coupled to a third motor configured to operate the third tool. The second force control is coupled to a fourth motor configured to operate the fourth tools.

The first tool may be coupled to the first motor with a first coupler that, on a first end, removably couples to a spindle of the first motor. The coupler may, on a second end, removably couple to the first tool.

The first tool is selected from the group consisting of: a sander, a polisher, a denibber, a wiper.

The system may also include one or more sensors configured to detect a working state of the end-effector tool, while the functional component contacts and prepares the object surface and a control circuit to receive signals from the sensors and process the signals to generate state information of the end-effector tool. The sensors may include at least one of an linear position sensor to obtain the position data, a pressure sensor to obtain the pressure data, and a sensor to obtain the surface mapping data.

The system may also include a mounting interface to functionally connect the end effector system to the motive robot arm.

The system may also include a nozzle configured to dispense a fluid onto the object surface. The fluid may be water, surfactant or polish.

The control circuit may also include a communication component to communicate signals between the control circuit and a control system of the motive robot arm.

An automated surface preparation system is provided that may include the end effector system of any embodiments described herein mounted on a motive robot arm. The motive robot arm may also include a microprocessor to execute a robot control system. The motive robot arm may be an automotive repair robot, and wherein the first tool is configured to contact and abrade the surface. Abrading the surface includes the first tool removing a layer of material from the surface. The layer of material may be a layer of paint, primer, e-coat or clear coat on the surface.

A method of using a surface preparation system to prepare an object surface is described. The method includes detecting an end effector system in a first position. The end effector system includes a first tool and a second tool. In a first position, the first tool is aligned with the object surface. The method also includes receiving an input that a second tool is needed to prepare the object surface. The method also includes actuating a movement mechanism of the end effector system. Actuation includes the movement mechanism causing the second tool to align with the object surface. The method also includes validating the position of the second tool. The steps of detecting, receiving, actuating and validating are performed by the end effector system in response to instructions generated by a processor associated with the end effector system.

The first tool may include a first motor and the second tool may include a second motor, and wherein the first and second motors are mounted to the force control.

The first and second motors may be mounted 180° apart.

The end effector system may be mounted to a motive robot arm.

The processor may be associated with the motive robot arm.

In implementing the method, the first tool, second tool and force control may be fixed with respect to each other, and the movement mechanism may be a portion of the motive robot arm.

In implementing the method, the movement mechanism may be a plate within the motive robot arm, and wherein causing the second tool to align may include rotating the plate until the second tool is in position.

In implementing the method, receiving input may include receiving instructions from a controller. The instructions may include an end effector system position, and the end effector system position may be either the first position or the second position.

In implementing the method, the motive robot arm may further include a microprocessor to execute a robot control system.

In implementing the method, the end effector system may further include a third tool configured to contact and prepare the object surface, a fourth tool configured to contact and prepare the object surface, and the third tool may be configured to operate when the end effector system is in a third position, and the fourth tool may be configured to operate when the end effector system is in a fourth position.

In implementing the method, the system may further include a second force control coupled to a third motor configured to operate the third tool. The second force control may be coupled to a fourth motor configured to operate the fourth tools. The first tool may be coupled to the first motor with a first coupler that, on a first end, removably couples to a spindle of the first motor. The coupler, on a second end, may removably couple to the first tool.

In implementing the method, the first tool may be a sander, a polisher, a denibber, a wiper. The second tool may be the same as the first tool. The second tool may be different from the first tool.

In implementing the method, the system may also include one or more sensors configured to detect a working state of the end-effector tool, while the functional component contacts and prepares the object surface, and a control circuit to receive signals from the sensors and process the signals to generate state information of the end-effector tool.

In implementing the method, the sensors may include at least one of an linear distance sensor to obtain the position data, a pressure sensor to obtain the pressure data, and a sensor to obtain the surface mapping data.

In implementing the method, the system may further include a mounting interface to functionally connect the end effector system to the motive robot arm.

The method may also include dispensing, using a nozzle associated with the second tool, a fluid onto the object surface. The fluid may be water, surfactant or polish.

Reference throughout this specification to "one embodiment," "certain embodiments," "one or more embodiments," or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

What is claimed is:

1. A dual mounted end-effector system mounted on a motive robot arm for preparing an object surface, the end effector system comprising:
    a first tool configured to contact and prepare the object surface;
    a second tool configured to contact and prepare the object surface;
    wherein the first tool and the second tool are arranged such that the tools are rotationally 180° apart from one another;
    a single force control to control force for both the first tool and the second tool; and
    wherein the force control is configured to align, in a first state, with the first tool in position to contact and prepare the object surface and, in a second state, with the second tool in a position to contact and prepare the object surface,
    the first and second tools are coupled to the same surface of the force control, and the force control enables interchange of the first and second states by 180° rotation of the first and second tools,
    wherein the first tool has a first motor configured to operate the first tool when the system is in a first position, and wherein the second tool has a second motor configured to operate the second tool when the system is in a second position.

2. The system of claim 1, wherein the first tool is selected from the group consisting of a sander, a polisher, a denibber, a sprayer, a fluid applicator, or a fluid removal tool.

3. The system of claim 1, wherein the first and second tool are the same.

4. The system of claim 1, wherein the first and second tool are different.

5. The system of claim 1, and further comprising:
    a third tool configured to contact and prepare the object surface;
    a fourth tool configured to contact and prepare the object surface; and
    wherein the third tool is configured to operate when the end effector system is in a third position, and wherein the fourth tool is configured to operate when the end effector system is in a fourth position.

6. The system of claim 5, wherein the system further comprises a second force control coupled to a third motor configured to operate the third tool, and wherein the second force control is coupled to a fourth motor configured to operate the fourth tools.

7. The system of claim 1, wherein the first tool is coupled to the first motor with a first coupler that, on a first end, removably couples to a spindle of the first motor.

8. The system of claim 7, wherein the coupler, on a second end, removably couples to the first tool.

9. The system of claim 1, wherein the second tool is selected from the group consisting of: a sander, a polisher, a denibber, a wiper.

10. The system of claim 1, and further comprising:
    one or more sensors configured to detect a working state of the end-effector tool, while the functional component contacts and prepares the object surface; and a control circuit to receive signals from the sensors and process the signals to generate state information of the end-effector tool.

11. The system of claim 10, wherein the sensors include at least one of an linear position sensor to obtain the position data, a pressure sensor to obtain the pressure data, and a sensor to obtain the surface mapping data.

12. The system of claim 1, wherein the control circuit includes a communication component to communicate signals between the control circuit and a control system of the motive robot arm.

13. An automated surface preparation system comprising:
the end-effector system of claim 1;
a motive robot arm; and
wherein the system is mounted on the motive robot arm.

14. The system of claim 13, wherein the motive robot arm further includes a microprocessor to execute a robot control system.

15. The system of claim 1, wherein the motive robot arm is an automotive repair robot, and wherein the first tool is configured to contact and abrade the surface.

16. The system of claim 15, wherein abrading the surface comprises the first tool removing a layer of material from the surface, and wherein the layer of material is a layer of paint, primer, e-coat or clear coat on the surface.

17. A method of using a surface preparation system to prepare an object surface, the method comprising:
detecting an end effector system in a first position, wherein the end effector system comprises a first tool, a second tool, and a single force control to control force for both the first tool and the second tool, wherein the first and second tools are coupled to the same surface of the force control, the first tool has a first motor configured to operate the first tool when the system is in a first position, and wherein the second tool has a second motor configured to operate the second tool when the system is in a second position, and wherein, in a first position, the first tool is aligned with the object surface with the force control controlling the force applied by the first tool to the object surface and the force control enables interchange of the first and second states by 180° rotation of the first and second tools;
receiving an input that a second tool is needed to prepare the object surface;
actuating a movement mechanism of the end effector system, wherein actuation comprises the movement mechanism causing the second tool to align with the object surface with the force control controlling the force applied by the second tool to the object surface;
validating the position of the second tool; and
wherein the steps of detecting, receiving, actuating and validating are performed by the end effector system in response to instructions generated by a processor associated with the end effector system.

18. The method of claim 17, wherein the first and second tools are mounted 180° apart.

19. The method of claim 17, wherein the end effector system is mounted to a motive robot arm.

20. The method of claim 19, wherein the first tool, second tool and force control are fixed with respect to each other, and wherein the movement mechanism is a portion of the motive robot arm.

21. The method of claim 17, wherein the end effector system further comprises:
a third tool configured to contact and prepare the object surface;
a fourth tool configured to contact and prepare the object surface; and
wherein the third tool is configured to operate when the end effector system is in a third position, and wherein the fourth tool is configured to operate when the end effector system is in a fourth position.

22. The method of claim 21, wherein the system further comprises a second force control coupled to a third motor configured to operate the third tool, and wherein the second force control is coupled to a fourth motor configured to operate the fourth tools.

23. The method of claim 22, wherein the first tool is coupled to the first motor with a first coupler that, on a first end, removably couples to a spindle of the first motor.

24. The method of claim 23, wherein the coupler, on a second end, removably couples to the first tool.

25. The method of claim 17, wherein the first tool is selected from the group consisting of: a sander, a polisher, a denibber, a wiper.

26. The method of claim 25, wherein the second tool is the same as the first tool.

27. The method of claim 25, wherein the second tool is a different tool from the first tool.

28. The method of claim 17, and further comprising:
one or more sensors configured to detect a working state of the end-effector tool, while the functional component contacts and prepares the object surface; and
a control circuit to receive signals from the sensors and process the signals to generate state information of the end-effector tool.

29. The method of claim 28, wherein the sensors include at least one of an linear distance sensor to obtain the position data, a pressure sensor to obtain the pressure data, and a sensor to obtain the surface mapping data.

* * * * *